United States Patent
Storey et al.

(10) Patent No.: US 9,302,217 B2
(45) Date of Patent: Apr. 5, 2016

(54) ELECTROLYZED WATER—AMINE COMPOSITIONS AND METHODS OF USE

(75) Inventors: William Dale Storey, Lacombe (CA); Norman L. Arrison, Lacombe (CA); Dale R. Schadeck, Lacombe (CA)

(73) Assignee: 1623920 Alberta Ltd., Red Deer, Alberta (CA)

( * ) Notice: Subject to any disclaimer, the term of this patent is extended or adjusted under 35 U.S.C. 154(b) by 543 days.

(21) Appl. No.: 13/364,859

(22) Filed: Feb. 2, 2012

(65) Prior Publication Data

US 2012/0202721 A1 Aug. 9, 2012

Related U.S. Application Data

(60) Provisional application No. 61/438,835, filed on Feb. 2, 2011.

(51) Int. Cl.
*C23F 11/08* (2006.01)
*B01D 53/14* (2006.01)
*B01D 53/40* (2006.01)

(52) U.S. Cl.
CPC ........ *B01D 53/1456* (2013.01); *B01D 53/1493* (2013.01); *B01D 53/40* (2013.01); *B01D 2251/306* (2013.01); *B01D 2252/103* (2013.01); *B01D 2252/204* (2013.01); *B01D 2252/2021* (2013.01); *B01D 2256/24* (2013.01); *B01D 2257/304* (2013.01); *B01D 2257/306* (2013.01); *B01D 2257/308* (2013.01); *B01D 2257/504* (2013.01); *C09K 2208/20* (2013.01); *Y02P 20/152* (2015.11)

(58) Field of Classification Search
None
See application file for complete search history.

(56) References Cited

U.S. PATENT DOCUMENTS

| | | | |
|---|---|---|---|
| 4,470,918 A * | 9/1984 | Mosier | 252/77 |
| 2006/0062753 A1* | 3/2006 | Naraghi et al. | 424/78.27 |
| 2009/0308612 A1* | 12/2009 | Weaver et al. | 166/293 |
| 2010/0093736 A1* | 4/2010 | Coburn et al. | 514/241 |
| 2011/0030959 A1* | 2/2011 | Emmons | 166/305.1 |

* cited by examiner

*Primary Examiner* — Alicia Bland
(74) *Attorney, Agent, or Firm* — Bennett Jones LLP

(57) ABSTRACT

The invention is directed to a treatment fluid comprising electrolyzed water and an amine, and methods for producing and using same in the treatment of a gas or liquid containing a contaminant such as an acid gas or a sulphur compound.

16 Claims, No Drawings

ELECTROLYZED WATER—AMINE COMPOSITIONS AND METHODS OF USE

CROSS REFERENCE TO RELATED APPLICATIONS

This application claims the priority benefit of U.S. Provisional Application No. 61/438,835 filed on Feb. 2, 2011, entitled "Composition and Method for Scavenging Sulphur Compounds", the contents of which are incorporated herein by reference.

FIELD OF THE INVENTION

The present invention is directed to a treatment fluid comprising electrolyzed water and an amine, and methods for producing and using same in the treatment of a fluid containing a contaminant such as an acid gas or a sulphur compound.

BACKGROUND OF THE INVENTION

In upstream oil and gas operations, hydrocarbon liquids and gases are typically produced with some contaminants, such as acid gases and sulphur compounds. Acid gases are gases which form acidic solutions when mixed with water, and typically comprise hydrogen sulphide and carbon dioxide. Hydrogen sulphide is a colorless, flammable, poisonous gas, having a characteristic foul odor of rotten eggs. It may be produced from the bacterial breakdown of organic proteinaceous matter from plants or animals, or by contact at high temperatures between elemental sulphur or certain sulphur-containing compounds and organic materials. Hydrogen sulphide may also be formed as an undesirable byproduct in various industrial processes such as, for example, the production of coke from sulphur-containing coal; the refining of sulphur-containing crude oils; the production of disulphide; the manufacture of viscose rayon; and the Kraft process for conversion of wood into wood pulp.

Hydrogen sulphide may also be a byproduct of wastewater from treatment plants or water from agricultural practices. Unpleasant odors from liquids used in janitorial processes, RV holding tanks, portable toilets and the like are typically attributed to hydrogen sulphide. Such foul odors may be eliminated if the emission of hydrogen sulphide could be controlled in some manner.

Natural gas or crude oil having high concentrations of hydrogen sulphide are known as "sour gas" and "sour crude" respectively. Hydrogen sulphide in sour gas and crude oil streams is separated during gas sweetening processes, such as the widely used amine process which requires a solution of water and a chemical amine to remove carbon dioxide and several sulphur compounds.

Since hydrogen sulphide is toxic, it represents a significant threat to public safety and health, and has potential to cause serious health risks in the oil and gas, livestock, waste management, and janitorial industries. At 200 ppm, hydrogen sulphide is undetectable by smell, and a concentration greater than 200 ppm induces nausea and headaches. At 500 to 1000 ppm, hydrogen sulphide leads to unconsciousness, with death resulting within two to twenty minutes unless the victim is removed immediately from exposure.

Other contaminants of natural gas or crude oil include sulphur compounds such as mercaptans.

There is thus a need for a simple, economical and effective means of removing contaminants such as acid gases or sulphur compounds from hydrocarbons or other gases or liquids.

SUMMARY OF THE INVENTION

The present invention is directed to a treatment fluid comprising electrolyzed water and an amine, and methods for producing and using same in the treatment of a hydrocarbon gas or liquid containing contaminants.

In one aspect, the invention comprises a treatment fluid for treating a gas or a liquid containing an acid gas therein, comprising electrolyzed water in an amount between about 20% to about 80% by volume based on the total volume of the treatment fluid, and an amine in an amount between about 20% to about 80% by volume based on the total volume of the treatment fluid.

In one embodiment, electrolyzed water is present in an amount of about 50% by volume based on the total volume of the treatment fluid. In one embodiment, the amine is present in an amount of about 50% by volume based on the total volume of the treatment fluid. In one embodiment, the amine comprises monoethanolamine.

In one embodiment, the pH of the treatment fluid is in a range above about pH 12.0. In one embodiment, the pH of the treatment fluid is between about pH 12.6 and 13.3.

In one embodiment, the treatment fluid is prepared by (a) mixing electrolyzed water and amine to form a mixture; (b) stirring the mixture; and (c) allowing the mixture to cool.

In one embodiment, the treatment fluid further comprises an alcohol, such as methanol, and/or a salt, such as potassium chloride solution.

In another aspect, the invention comprises a method for treating a gas or a liquid containing a contaminant, comprising the step of contacting the gas or the liquid with a treatment fluid as described herein, resulting in a decrease in the amount of the contaminant. The method may be practiced in a vessel or chamber. In one embodiment, the invention comprises an in-situ method of treatment by injection of the treatment fluid into a wellbore or a subterranean formation.

In one embodiment, the gas or liquid comprises natural gas, sour gas, sour crude oil, sour water, or mixtures thereof. In one embodiment, the contaminant comprises an acid gas, or a sulphur compound such as hydrogen sulphide, carbonyl sulphide, or a mercaptan. In one embodiment, the mercaptan comprises methyl mercaptan, ethyl mercaptan, n-propyl mercaptan, or iso-butyl mercaptan.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

The present invention is directed to a treatment fluid comprising electrolyzed water and an amine, and methods for producing and using same in the treatment of a gas or liquid. When describing the present invention, all terms not defined herein have their common art-recognized meanings.

In one embodiment, the invention provides a treatment fluid for treating a gas or a liquid containing a contaminant comprising an acid gas or a sulphur compound therein, comprising electrolyzed water in an amount between about 20% to about 80% by volume based on the total volume of the treatment fluid, and an amine in an amount between about 20% to about 80% by volume based on the total volume of the treatment fluid.

In one embodiment, the invention provides a method for treating a gas or a liquid containing a contaminant comprising an acid gas or sulphur compound, comprising the step of contacting the gas or the liquid with the treatment fluid of the present invention, resulting in a decrease in the amount of the contaminant.

In one embodiment, the invention provides an in situ method for treating a gas or a liquid containing a contaminant comprising an acid gas or a sulphur compound therein produced from a well, comprising the step of injecting the treatment fluid of the present invention into the well or a subterranean formation so as to contact the gas or the liquid, resulting in a decrease in the amount of the contaminant.

Electrolyzed water is also known as electro-activated water or electro-chemically activated water solution. It is produced by the electrolysis of ordinary water containing dissolved sodium or potassium chloride. In one embodiment, the concentration of the sodium chloride is in the range of between about 10 ppm to about 50 ppm, and in a preferred embodiment, the concentration of the sodium chloride is about 35 ppm. As used herein, "anolyte" means an aqueous solution produced at the anode by the electrolysis of aqueous solutions of sodium or potassium chloride. The anolyte produced comprises free available chlorine, primarily in the form of sodium hypochlorite. In one embodiment, the anolyte comprises greater than about 4000 ppm of free chlorine. The amount of free chlorine in a sample of anolyte is known to slowly decrease over time. "Catholyte" is the aqueous solution which is produced at the cathode.

As used herein, "electrolyzed water" means any aqueous solution which contains free available chlorine resulting from the electrolysis of water having dissolved chloride ions. It may include anolyte, or anolyte which has been mixed with catholyte.

To prepare the treatment fluid of the present invention, suitable solutions of anolyte may be produced by an electrolysis reactor, such as that described, for example, in U.S. Pat. No. 4,875,988 to Aragon, issued Oct. 24, 1989; U.S. Pat. No. 5,540,819 to Bakhir et al., issued Jul. 30, 1996; U.S. Pat. No. 5,628,888 to Bakhir et al., issued May 13, 1997; and co-pending U.S. patent application Ser. No. 12/962,385 to Storey and Arrison, filed Dec. 7, 2010 (the contents of which are incorporated herein by reference). If the anode and cathode compartments are separated by a semi-permeable membrane, the composition of the anolyte and catholyte may be quite different. Typically, the anolyte is pH neutral or slightly acidic, while catholyte is basic due to the production of sodium hydroxide.

Without restriction to a theory, it is believed that anolyte does not contain chlorite ($ClO_2^-$) and chlorate ($ClO_3^-$) ions. The free available chlorine in anolyte exists primarily as hypochlorous acid (HClO) or hypochlorite ions ($ClO^-$), free chlorine ($Cl_2$) and chloride ion (Cl). Without restriction to a theory, it is believed that hypochlorous acid and hypochlorite ions, free chlorine, and/or chloride ions, are restricted or limited in crossing the ionomeric semi-permeable membrane. As a result, they accumulate in the anolyte to very high levels.

In one embodiment, the anolyte is combined with the catholyte (primarily sodium hydroxide) produced at the cathode in the electrolytic process. The resulting solution still maintains a high concentration of free available chlorine and may have a pH of about 8.3. Without restriction to a theory, it is believed that the majority of the free available chlorine exists as NaHClO (sodium hypochlorite). In one embodiment, the concentration of free available chlorine is greater than about 1000 ppm in the electrolyzed water, preferably greater than about 2000 ppm, and more preferably greater than about 3000 ppm. The concentration may be as high as about 4400 ppm.

Amines may be produced through well known chemical syntheses, and are readily commercially available. As used herein, "amine" means an organic compound with one or more of the hydrogen atoms in ammonia replaced by organic groups. The term includes the three classes of amines dependent on the number of hydrogen atoms replaced, namely primary, secondary and tertiary amines. The organic groups can include aliphatic, alicyclic or aromatic groups. Examples of amines include, but are not limited to, monoethanolamine, methylamine, ethylamine, diethylamine, trimethylamine, aniline, benzylamine, and the like. In one embodiment, the amine comprises monoethanolamine.

The treatment fluid of the present invention is prepared by combining electrolyzed water with an amine solution to form a mixture. In one embodiment, exothermic reactions occur upon mixing, and the mixture is left to cool before use. Preparation of the treatment fluid should preferably be conducted in a well-ventilated area, due to the possibility of chlorine gas production. In one embodiment, the pH of the treatment fluid is in a range of about pH 12.0 or higher and may be in the range of about 12.6 to about 13.3. In one embodiment, the mixture does not have any free available chlorine. Without restriction to a theory, it is believed that the free available chlorine in the electrolyzed water is released as chlorine gas upon mixing with the amine.

It will be appreciated by those skilled in the art that the proportions of the individual components may be varied to optimize the contaminant removal effect produced by the treatment fluid to suit the specific gas or liquid being treated. In one embodiment, the proportion of the electrolyzed water to the amine solution is in an amount between about 20% to about 80% by volume based on the total volume of the treatment fluid. In a preferred embodiment, the electrolyzed water is present in an amount of about 50% by volume based on the total volume of the treatment fluid. In one embodiment, amine is present in an amount between about 20% to about 80% by volume based on the total volume of the treatment fluid, and in a preferred embodiment, is present in an amount of about 50% by volume based on the total volume of the treatment fluid.

The treatment fluid may be used as mixed, or may be diluted in water, an aqueous salt solution, or an alcohol, or mixtures thereof. In one embodiment, the treatment fluid may be used diluted in water as a 2% (v:v) solution, with good hydrogen sulphide removal activity. In another embodiment, the treatment fluid is miscible and may be mixed with methanol prior to use. In another embodiment, the treatment fluid may be mixed with a potassium chloride solution to increase the density of the treatment fluid when used downhole.

Once prepared, the treatment fluid may be evaluated to ensure scavenging activity by testing one or more samples of different gases and liquids known to contain acid gases or sulphur compounds. Non-limiting examples of such gases and liquids include natural gas, sour gas, sour crude oil, sour water, or mixtures thereof. As used herein, "natural gas" means a mixture of hydrocarbon gases which occurs with petroleum deposits, principally methane together with varying quantities of ethane, propane, butane, and other gases, and impurities including hydrogen sulphide and carbon dioxide. "Sour gas" means natural gas comprising gases which are acidic either alone or when associated with water. The term includes acid gases associated with oil and gas drilling and production such as, for example, hydrogen sulfide and carbon dioxide. "Sour water" means waste waters containing fetid materials comprising sulfur compounds.

As used herein, "sulphur compound" means a substance consisting of two or more elements in union, with at least one element being sulphur. The sulphur compound may be selected from hydrogen sulphide, carbonyl sulphide or a mercaptan including, but not limited to, methyl mercaptan, ethyl mercaptan, n-propyl mercaptan and iso-butyl mercaptan.

It will be recognized by those skilled in the art that there are various suitable methods for measuring hydrogen sulfide in environmental samples including, but not limited to, gas chromatography with flame photometric detection, gas chromatography with electrochemical detection, iodometric methods, the methylene blue colorimetric or spectrophotometric method, the spot method using paper or tiles impregnated with lead acetate or mercuric chloride, ion chromatography with conductivity, potentiometric titration with a sulfide ion-selective electrode, atomic absorption spectroscopy, and the like. Sulphur compounds such as mercaptans have a characteristic disagreeable sulphurous odor, even in very low concentrations. The absence of such odors, while not conclusive, is evidence that sulphur compounds are not present.

Gases and liquids containing sulphur compounds or carbon dioxide may thus be treated by contacting the gases or liquids with the treatment fluid of the present invention, resulting in a decrease in the amount of the acid gases or sulphur compounds. As demonstrated in Examples 2-7, the composition decreased the amount of hydrogen sulphide in sour gas (Example 2), sour crude oil (Examples 3-5 and 8), sour water (Examples 6-7) and in situ mixtures of gas, sour crude oil and sour water (Examples 9-10). The magnitude of the decrease in such amounts appears to be dependent upon the duration of treatment. In Examples 3-5, the amount of hydrogen sulphide decreased within one hour of treatment. Within twenty-four hours, no hydrogen sulphide was detected. Without restriction to a theory, it is believed that the treatment fluid of the present invention scavenges sulphur compounds, hydrogen sulphide or carbon dioxide within gases or liquids. In one embodiment, the gas or the liquid is treated for at least one hour. In one embodiment, the gas or the liquid is treated for between about two to about three hours. In one embodiment, the gas or the liquid is treated for about twenty-four hours.

The treatment may comprise any method of contacting the gas or liquid with the treatment fluid, such as bubbling gases through a liquid, or agitation of a mixture within a closed container. Suitable methods and apparatuses are well known to those skilled in the art of sweetening sour gas and sour crude streams.

Without restriction to a theory, it is believed that the electrolyzed water-amine composition may also have a germicidal effect on microorganisms which can generate hydrogen sulphide such as Desulfovibrio species, and other sulphate-reducing bacteria. Accordingly, when used in situ, such as by injection into a wellbore or a producing formation, the treatment fluid may have the dual effect of neutralizing acid gases, and also killing the microorganisms that may be producing hydrogen sulphide.

Exemplary embodiments of the present invention are described in the following Examples, which are set forth to aid in the understanding of the invention, and should not be construed to limit in any way the scope of the invention as defined in the claims which follow thereafter.

Example 1

Preparation of Electrolyzed Water-Amine Composition

The anolyte-amine treatment fluid used in Examples below was prepared by mixing equal volumes of electrolyzed water (4,400 ppm free available chlorine) made by combining equal volumes of anolyte and catholyte, with liquid monoethanolamine, with stirring. The mixture heated up upon mixing, and was allowed to cool to room temperature before use.

Example 2

Treatment of Gas with Electrolyzed Water-Amine Composition

Gas having a total volume of 198,000 $ft^3$ and a concentration of 4,000 ppm of hydrogen sulphide was treated by flushing the gas at a flow rate of 12,000 $ft^3$/min through a column containing 1 $m^3$ of water with a 2% (v:v) solution of the electrolyzed water-amine treatment fluid for two hours and forty-five minutes. The exit stream did not contain any hydrogen sulphide. The test was repeated, with the total volume of gas being 216,000 $ft^3$ and treatment for three hours. The exit stream did not contain any hydrogen sulphide. No sulphurous odor was detected.

Example 3

Treatment of Sour Crude Oil with Electrolyzed Water-Amine Composition

Three jars containing 500 mL of sour crude oil having 16,000 ppm of hydrogen sulphide were treated with 10 and 20 mL of the electrolyzed water-amine treatment fluid. The concentration (ppm) of hydrogen sulphide remaining after various timepoints is summarized in Table 1:

TABLE 1

| $H_2S$ at time 0 (ppm) | $H_2S$ at 1 hour (ppm) | $H_2S$ at 24 hours (ppm) | Anolyte-amine composition (mL) |
|---|---|---|---|
| 16,000 | 30 | 0 | 10 |
| 16,000 | 15 | 0 | 10 |
| 16,000 | 8 | 0 | 20 |

Example 4

Treatment of Sour Crude Oil with Electrolyzed Water-Amine Composition

Three jars containing 500 mL of sour crude oil having 5,000 ppm of hydrogen sulphide were treated with 5, 10, and 20 mL of the anolyte-amine treatment fluid. No sulphurous odor was detected after 24 hours. The concentration (ppm) of hydrogen sulphide remaining after various timepoints is summarized in Table 2:

TABLE 2

| H₂S at time 0 (ppm) | H₂S at 2 hours (ppm) | H₂S at 24 hours (ppm) | electrolyzed water-amine composition (mL) |
|---|---|---|---|
| 5,000 | 25 | 0 | 5 |
| 5,000 | 10 | 0 | 10 |
| 5,000 | 20 | 0 | 20 |

Example 5

Treatment of Sour Crude Oil with Electrolyzed Water-Amine Composition

Two jars containing 500 mL of sour crude oil having 6,000 ppm of hydrogen sulphide were treated with 5 and 10 mL of the anolyte-amine treatment fluid. No sulphurous odor was detected after 24 hours. The concentration (ppm) of hydrogen sulphide remaining after various timepoints is summarized in Table 3:

TABLE 3

| H₂S at time 0 (ppm) | H₂S at 1 hour (ppm) | H₂S at 24 hours (ppm) | electrolyzed water-amine composition (mL) |
|---|---|---|---|
| 6,000 | 20 | 0 | 5 |
| 6,000 | 10 | 0 | 10 |

Example 6

Treatment of Sour Water with Electrolyzed Water-Amine Composition

Two jars containing 500 mL of sour water having 35,000 ppm of hydrogen sulphide were treated with 1 mL of the electrolyzed water-amine treatment fluid. The concentration (ppm) of hydrogen sulphide remaining after various timepoints is summarized in Table 4:

TABLE 4

| H₂S at time 0 (ppm) | H₂S at 1 hour (ppm) | H₂S at 24 hours (ppm) | Anolyte-amine composition (mL) |
|---|---|---|---|
| 35,000 | 2,000 | 2,000 | 1 |

Example 7

Treatment of Waste Sour Water with Electrolyzed Water-Amine Composition

A truck tank initially contained 13,510 liters of waste sour water having 35,000 ppm of hydrogen sulphide. Twenty liters of the electrolyzed water-amine treatment fluid were added. After thirty-seven minutes, the concentration of hydrogen sulphide of the sour water had decreased to 1,400 ppm.

Example 8

Treatment of Sour Crude Oil with Electrolyzed Water-Amine Composition in Methanol Solution Approximately 125 mL of electrolyzed water-amine treatment fluid was mixed with 125 mL of methanol to produce a homogeneous solution. The solution was allowed to rest for 24 hours, over which time the electrolyzed water-amine treatment fluid remained miscible within the methanol.

Ten milliliters of the methanol mixture solution was added to a container containing 500 mL of a sour crude oil sample initially having 200 ppm of hydrogen sulphide. The mixture was shaken every five to ten minutes over a one-hour period. The concentration of hydrogen sulphide was measured as zero parts per million.

Example 9

Treatment of Sour Crude Oil, Sour Gas and Sour Water Mixture In Situ in Well with Electrolyzed Water-Amine Composition in Potassium Chloride Solution A well produced 75 barrels of oil per day, 100 barrels of water per day and 90,000 cubic feet of natural gas per day. The well casing mixture contained 1,800 ppm of hydrogen sulphide. The well was swabbed to determine which one of its five producing zones was sour. The sour zone was isolated by plug means.

Approximately 55 US gallons of electrolyzed water-amine treatment fluid was mixed with 130 barrels of a 2 percent potassium chloride solution. The mixture was pushed into the sour zone. For the next 1.5 days, the hydrogen sulphide concentration in the oil well casing mixture reduced to 0 to 100 ppm. After three days of production, the hydrogen sulphide concentration in the oil well casing mixture increased back to 1,800 ppm.

Example 10

Treatment of Sour Crude Oil, Sour Gas and Sour Water Mixture In Situ

Electrolyzed water-amine treatment fluid was directly injected into the casing of the well described in Example 9, at a rate of 13.5 US gallons per day. The hydrogen sulphide concentration in the production mixture reduced from 1,800 ppm to 400 ppm. When the produced stream was pumped into a storage tank and tested after 24 hours residence time, there was no detectable hydrogen sulphide.

REFERENCES

The following references are incorporated herein by reference (where permitted) as if reproduced in their entirety. All references are indicative of the level of skill of those skilled in the art to which this invention pertains.

Aragon, P. J. Electrolytic cell. U.S. Pat. No. 4,875,988, issued Oct. 24, 1989.

Bakhir, V. M.; Vedenkov, V. G.; Leonov, B. I.; Prilutsky, V. I.; Repetin, E. A.; Zadorozhny, J. G.; Naida, N. N.; Mashkov, O. A.; Dzheiranishvili, N. V. and Butin, S. K. Water treatment method. U.S. Pat. No. 5,540,819, issued Jul. 30, 1996.

Bakhir, V. M.; Zadorozhny, J. G. and Barabash, T. Apparatus for electrochemical treatment of water and/or water solutions. U.S. Pat. No. 5,628,888, issued May 13, 1997.

Storey, W. D. and Arrison, N. L. Microcidal composition. U.S. patent application Ser. No. 12/962,385, filed Dec. 7, 2010.

What is claimed is:

1. A treatment fluid for treating a gas or a liquid comprising a contaminant comprising an acid gas or a sulphur compound, comprising reaction products of electrolyzed water and monoethanolamine.

2. The treatment fluid of claim 1, produced by mixing electrolyzed water in an amount between about 20% to about 80% by volume and monoethanolamine in an amount between about 20% to about 80% by volume based on the total volume of the treatment fluid.

3. The treatment fluid of claim 2, produced by mixing electrolyzed water and monoethanolamine in about equal volumes.

4. The treatment fluid of claim 1, 2 or 3 wherein the electrolyzed water comprises anolyte and catholyte.

5. The treatment fluid of claim 2 wherein the pH of the treatment fluid is above about pH 12.0.

6. The treatment fluid of claim 5, wherein the pH of the treatment fluid is between about 12.6 to about 13.3.

7. The treatment fluid of claim 1 further comprising methanol or a dissolved salt.

8. The treatment fluid of claim 1 wherein the electrolyzed water comprises greater than about 4000 ppm of free available chlorine prior to mixing with monoethanolamine.

9. The treatment fluid of claim 2 or 8 which comprises substantially no free available chlorine.

10. A method for treating a gas or a liquid containing a contaminant comprising an acid gas or a sulphur compound therein, comprising the step of contacting the gas or the liquid with the treatment fluid of claim 1.

11. The method of claim 10, wherein the acid gas comprises hydrogen sulphide, or carbon dioxide.

12. The method of claim 10 wherein the sulphur compound comprises carbonyl sulfide, or a mercaptan.

13. The method of claim 12, wherein the mercaptan comprises methyl mercaptan, ethyl mercaptan, n-propyl mercaptan, or iso-butyl mercaptan.

14. The method of claim 10, wherein the gas or liquid is natural gas, sour crude oil, sour gas, sour water, or a mixture thereof.

15. The method of claim 10 wherein the gas or liquid containing a contaminant is in a wellbore, or a subterranean formation intersected by a wellbore, and the treatment fluid of claim 1 is injected into the wellbore.

16. An in situ method for treating a gas or a liquid containing a contaminant comprising an acid gas or a sulphur compound therein produced by a well, comprising the step of injecting the treatment fluid of claim 1 into the well so as to contact the gas or the liquid, wherein a decrease in the amount of the contaminant is effected.

* * * * *